Nov. 24, 1925.
D. C. HESSIAN
AIR BRAKE MECHANISM
Filed May 26, 1924
1,562,450
2 Sheets-Sheet 2
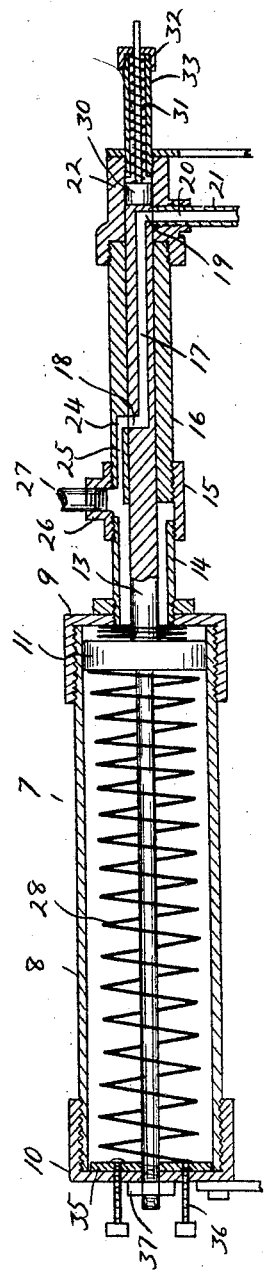
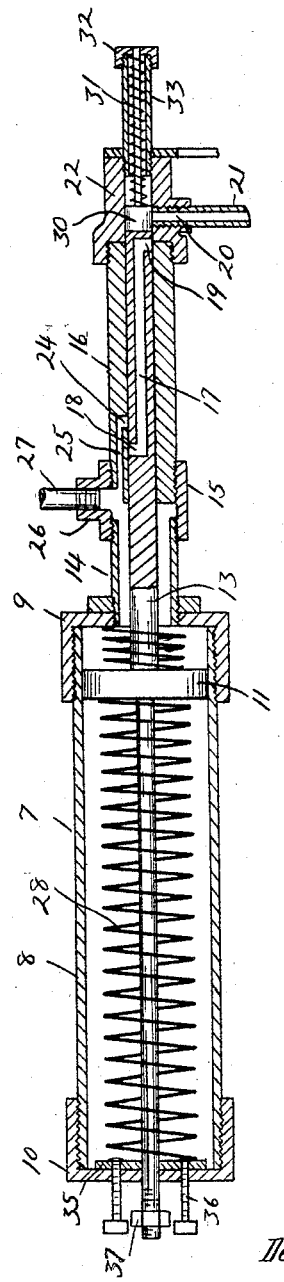
Inventor
Dennis C. Hessian
By Whittemore Hulbert Whittemore
+ Belknap
Attorneys Patented Nov. 24, 1925.

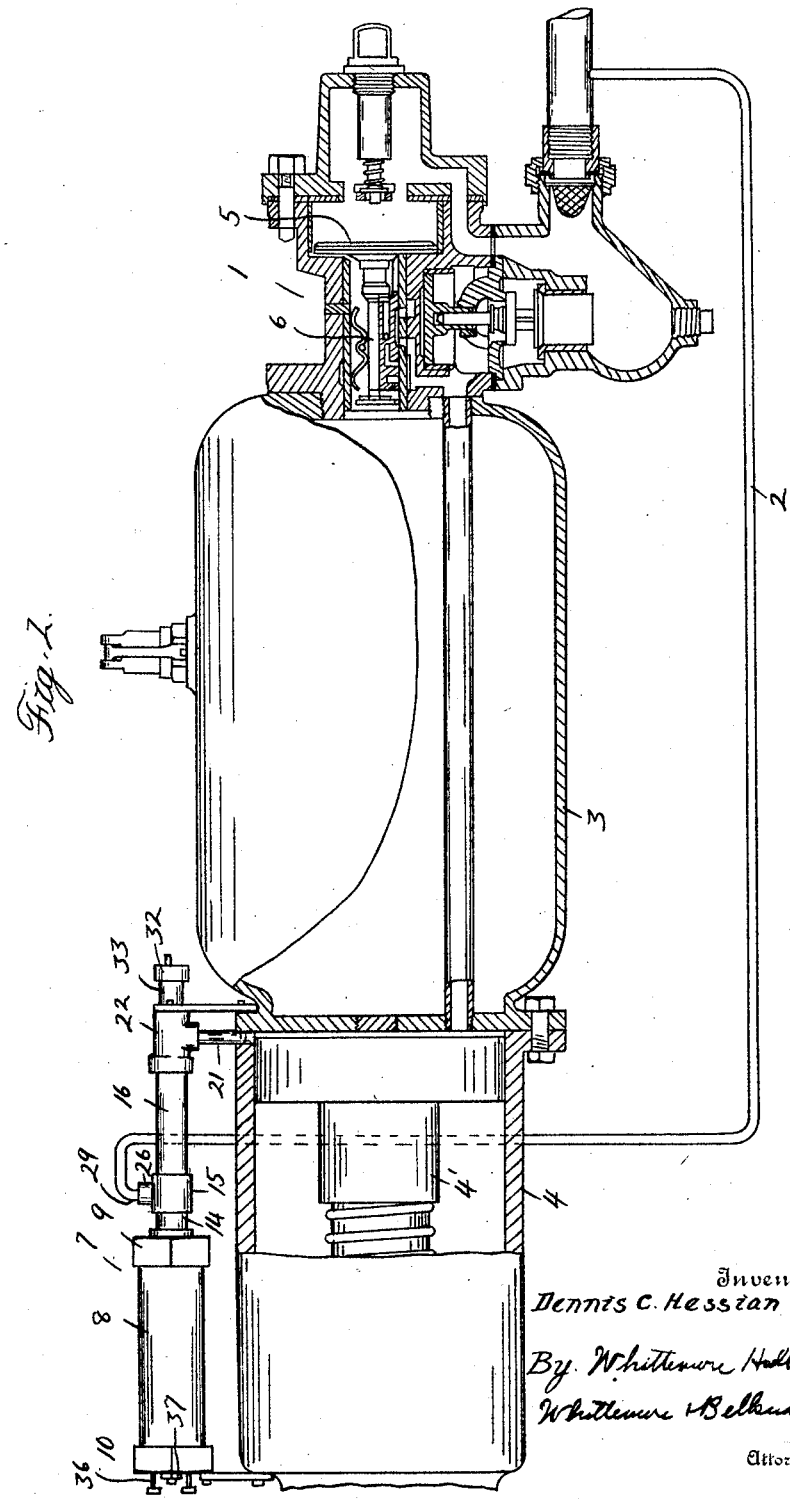

1,562,450

UNITED STATES PATENT OFFICE.

DENNIS C. HESSIAN, OF DETROIT, MICHIGAN.

AIR-BRAKE MECHANISM.

Application filed May 26, 1924. Serial No. 715,980.

*To all whom it may concern:*

Be it known that I, DENNIS C. HESSIAN, a citizen of the United States of America, residing at Detroit, in the county of Wayne and State of Michigan, have invented certain new and useful Improvements in Air-Brake Mechanism, of which the following is a specification, reference being had therein to the accompanying drawings.

This invention relates generally to automatic air brake systems and the like and refers more particularly to pressure equalizing attachments for the standard air brake systems of trains.

One of the essential objects of the invention is to provide a simple and inexpensive attachment of this type having means for maintaining the same air pressure in the usual brake cylinders as that in the main train line pipe or conduit when the brakes operated by the pistons in the cylinders are set so as to obviate the necessity of releasing and recharging the main train line pipe or conduit preliminary to making a further application of air to maintain slow speed when the train is going down a hill or inclined road bed.

Another object is to provide simple and effective means for regulating the operation of the pressure equalizing means.

With the above and other objects in view the invention consists in certain novel features of construction, combination and arrangement of parts as will be more fully described and particularly pointed out in the appended claims.

In the accompanying drawings:

Figure 1 is a side elevation of the usual brake apparatus of a car having parts broken away and in section and showing my invention applied thereto;

Figure 2 is an enlarged longitudinal sectional view through my attachment when the brakes are released;

Figure 3 is a view similar to Figure 2 but showing the parts in position when the brakes are set.

Referring now to the drawings in which like characters of reference designate corresponding parts throughout the several views, the numeral 1 designates a triple valve which may be either a quick action triple valve as shown or a plain triple valve and which controls first, the passage of air under pressure from the main train supply pipe or conduit 2 to an auxiliary reservoir 3; second, the passage of air under pressure from the auxiliary reservoir to the brake cylinder 4 which encloses the brake actuating mechanism, designated generally by the numeral 4' and third, the passage of air under pressure from the brake cylinder to the atmosphere. The main train pipe 2 receives its supply of air under pressure from a main reservoir (not shown) in communication with suitable air pumps (not shown) and the supply of air to the train pipe is controlled by means of a suitable valve (not shown) which is usually located in the cab of an engine and which also controls the passage of air from the train pipe 2 to the atmosphere. Normally the pressures of air are equal in the train pipe and in the auxiliary reservoir so that as soon as any reduction of pressure is made in the train pipe, as a result of the operation of the valve in the cab to permit the passage of air from the train pipe to the atmosphere or from other causes, the pressure of air in the auxiliary reservoir will be greater than that in the train pipe, consequently the piston 5 and slide 6 of the triple valve will be moved off of their respective seats to permit air from the auxiliary reservoir to pass into the brake cylinder and actuate the brake mechanism to set the brakes.

When the brakes are set, the pressures of air upon opposite sides of the triple valve will be equalized so that when an increase of pressure is made in the train pipe, the triple valve will usually operate to discharge the air from the brake cylinder and thus permit the brake mechanism to release the brakes before the auxiliary reservoir is recharged from the main train pipe or conduit 2. However, should the pressures of air in the brake cylinders be lower on account of leakage of air, it is apparent that the brakes would not hold effectively; and, before the auxiliary reservoir could be recharged and a further application of air could be made to reset the brakes, the latter would be released by the triple valves. Hence, there is a grave probability of the train gaining too much momentum or even getting beyond control before the brakes could be reset while the train is going down a hill or steep grade.

To overcome this very objectionable feature of the standard air brake system, I preferably provide an attachment designated generally at 7 for maintaining the air pressure in the brake cylinders at the same pressure as that in the main train line pipe or conduit 2 so that the necessity of recharging the system to make a further application of air is obviated entirely. In detail, an auxiliary cylinder 8 is preferably mounted on the brake cylinder 4 and is provided at its opposite ends with suitable caps 9 and 10 respectively. Located in the cylinder 8 is a suitable piston 11 that is adapted to be actuated by the compressed air from the main train line pipe 2. As shown, a stem 12 is secured to one side of the piston 11 and extends through the cap 10, while a rod 13 is preferably secured to the opposite side of the piston 11 and extends through the cap 9. Secured to the cap 9 is a tube 14 that preferably surrounds the rod 13 and is connected by a suitable T fitting to a tube 16 that also surrounds the rod 13. As shown, the rod 13 is preferably provided with a longitudinally extending passage 17 that connects at its opposite ends into the transversely extending passages 18 and 19 respectively. The passage 19 is adapted to register with the passage 20 in a tube 21 that is connected at its upper end to a T fitting 22 secured to the tube 16 and is connected at its lower end to the brake cylinder 4 adjacent to the auxiliary reservoir 3, while the transverse passage 18 is adapted to register with a transversely extending portion 24 of a restricted passage 25 extending longitudinally of the tube 16 and communicating with the main portion of the T fitting 15. The laterally extending portion 26 of the T fitting 15 is preferably connected by a suitable pipe or conduit 27 to the main train line pipe or conduit 2. Thus, when the rod 13 is disposed in the position shown in Figure 3 of the drawings, the brake cylinder 4 will be placed in communication with the main train line conduit 2 so that the air pressures therein will be equalized. For maintaining this equalization of air pressures in the brake cylinders and main train line pipe, I preferably provide a suitable coil spring 28 that surrounds the stem 12 and urges the piston 11 toward the cap 9. However, the tension of this spring is such that the normal built up pressure of air from the main train line pipe 2 against the piston 11 will hold the spring 28 compressed as shown in Figure 2 of the drawings. Hence, communication between the main train line pipe or conduit 2 and the pipe 21 leading to the brake cylinder will normally be cut off. Inasmuch as the passage 25 is restricted it will be readily apparent that air from the main train line pipe or conduit 2 will flow faster through the tube 14 toward the piston 11 in the cylinder 8, and as a result, the rod 13 will be moved rearwardly so that communication between the main train line pipe or conduit 2 will be cut off before pressure could be appreciably built up in the brake cylinder 4. However, the passage 25 is of such a size that sufficient air from the train line pipe 2 may be supplied to the brake cylinder 4 to take care of leakage and to maintain equal pressure in the cylinder and train line pipe when the brakes are set.

For preventing the escape of air from the brake cylinder when the passage 19 is out of registration with the passage 20, I preferably provide a small piston 30 that is slidably mounted in the main portion of the T fitting 22. In order that the movement of this piston 30 will be controlled automatically by the movement of the rod 13, I preferably provide a suitable coil spring 31 that extends between the piston 30 and a cap 32 secured to a tube 33 threadedly engaging the main portion of the T fitting 22. The spring 31 preferably surrounds the stem 34 of the piston 30 and is lighter in weight than the spring 28 so that it will be readily compressed by the piston 30 when the rod 13 is moved forwardly.

In order that the tension of the spring 28 may be varied to regulate the movement of the piston 11 and rod 13, I preferably provide an abutment plate 35 for the spring 28 that is sleeved on the stem 12 and is adapted to be adjusted longitudinally of the cylinder 8 by means of suitable bolts 36 threadedly engaging the cap 10. For limiting the forward movement of the piston 11 so that the transverse passage 19 in the rod 13 will register properly with the passage 20 in the tube 21, I preferably provide a suitable nut 37 that is threaded onto the stem 12 for engagement with the outside of the cap 10.

In use, when the brakes are released, the spring 28 will be compressed by the piston 11, the passages 18 and 19 will be out of registration with the passages 24 and 20 respectively and the piston 30 will close the passage 20 in the pipe 21 as shown in Figure 2 of the drawings. When the brakes are set the pressure in the train line conduit 2 will be reduced below the pressure of the spring 28, consequently, the latter will move the piston 11 forwardly so that the passages 18 and 19 respectively in the rod will register with the passages 24 and 20 respectively in the tube 16 and pipe 21 and the piston 30 will be moved against the spring 31 away from the passage 20. Air from the train line pipe 2 will then pass to the passage 20 in the pipe 21 leading to the brake cylinder whereby the pressure of air in the brake cylinder will be maintained at train line pressure without affecting the usual triple valve.

While it is believed that from the foregoing description, the nature and advantages of the invention will be readily apparent, I desire to have it understood that I do not limit myself to what is herein shown and described and that such changes may be resorted to when desired as fall within the scope of what is claimed.

What I claim as my invention is:

1. The combination with an air brake system including a main supply pipe and a brake cylinder, of means for maintaining the pressure of air in the brake cylinder substantially equal to the air pressure in the main pipe, said means including an auxiliary pipe connected to the brake cylinder, a member normally closing the passage in said pipe, an auxiliary pipe connected to the main pipe, a tube connected to said auxiliary pipes, and means in the tube engageable with the member aforesaid for controlling the passage of air from one auxiliary pipe to the other.

2. The combination with an air brake system including a main supply pipe and a brake cylinder, of means for automatically maintaining the pressure of air in the brake cylinder substantially equal to the air pressure in the main pipe, said means including auxiliary pipes connected respectively to said main pipe and brake cylinder, a tube connected to said auxiliary pipes, said tube having a passage constantly in communication with the first-mentioned auxiliary pipe, and a valve member in the tube having passages adapted to register with the passage in the tube and the passage in the last-mentioned auxiliary pipe.

3. The combination with an air brake system including a main supply pipe and a brake cylinder, of means for automatically maintaining the pressure of air in the brake cylinder substantially equal to the air pressure in the main pipe, said means including auxiliary pipes connected respectively to said main pipe and brake cylinder, a tube connected to said auxiliary pipes, said tube having a restricted passage, and a reciprocating valve member in the tube having transverse passages and a longitudinally extending passage connecting said transverse passages, one transverse passage being adapted to register with a portion of the restricted passage in said tube, the other transverse passage being adapted to register with the passage in the last-mentioned auxiliary pipe.

4. The combination with an air brake system including a main supply pipe and a brake cylinder, of means for maintaining the pressure of air in the brake cylinder substantially equal to the air pressure in the main pipe, said means including a connection between the main pipe and the brake cylinder, a reciprocating member controlling the passage of air through said connection, and yieldable means for actuating said member when the pressure of air in the main pipe reaches a predetermined pressure.

5. The combination with an air brake system including a main supply pipe and a brake cylinder, of means for automatically maintaining the pressure of air in the brake cylinder substantially equal to the air pressure in the main pipe, said means including a sectional conduit extending between the main pipe and brake cylinder, a member in one section of said conduit for controlling the passage of air through said conduit, and a yieldable member for actuating the member aforesaid.

6. The combination with an air brake system including a main supply pipe and a brake cylinder, of means for automatically controlling the pressure of air in the brake cylinder substantially equal to the air pressure in the main pipe, said means including auxiliary pipes connected respectively to said main pipe and said brake cylinder, a tube connected to said auxiliary pipes, a member in said tube for controlling the passage of air from one auxiliary pipe to the other, a yieldable member for actuating said member when the air pressure in the main pipe is reduced a pre-determined amount, and means for regulating the tension of said yieldable member whereby the first-mentioned member will be actuated when the air pressure is reduced a different pre-determined amount.

7. The combination with an air brake system including a main supply pipe and a brake cylinder, of means for automatically maintaining the pressure of air in the brake cylinder substantially equal to the air pressure in the main pipe, said means including auxiliary pipes connected respectively to said brake cylinder and main pipe, a tube connected to said auxiliary pipes, a member in the tube for controlling the passage of air from one auxiliary pipe to the other, an auxiliary cylinder connected to the last-mentioned auxiliary pipe to be supplied with air therefrom, a piston in the cylinder connected to the member aforesaid, and a yieldable member for actuating said piston when the pressure of air in the main pipe reaches a pre-determined pressure.

8. The combination with an air brake system including a main supply pipe and a brake cylinder, of means for automatically maintaining the pressure of air in the brake cylinder substantially equal to the air pressure in the main pipe, said means including auxiliary pipes connected respectively to said main pipe and said brake cylinder, a tube connected to said auxiliary pipes, means in the tube for controlling the passage of air from one auxiliary pipe to the other, an auxiliary cylinder connected to the first-mentioned auxiliary pipe adapted to be supplied with air therefrom, a piston in the cylinder adapted to move the control means for cutting off communication between the auxiliary pipes aforesaid, a yieldable member for actuating said control means for opening communication between said auxiliary pipes, and an adjustable member engaging said cylinder for regulating the tension of said yieldable member.

9. The combination with an air brake system including a main supply pipe and a brake cylinder, of means for automatically maintaining the pressure of air in the brake cylinder substantially equal to the air pressure in the main pipe, said means including an auxiliary pipe connected to the brake cylinder, an auxiliary pipe connected to the main pipe, a tube connected to said auxiliary pipes and having a restricted passage in communication with the last-mentioned auxiliary pipe, a member in said tube having transverse passages and a longitudinal passage connecting said transverse passages, one transverse passage being adapted to register with a portion of the restricted passage aforesaid, the other transverse passage being adapted to register with the passage in the first-mentioned auxiliary pipe, a piston adapted to be actuated by the air from the second-mentioned auxiliary pipe to move the member aforesaid rearwardly to place the transverse passages respectively out of registration with the restricted passage and passage in the first-mentioned auxiliary pipes, means for moving said piston and member forwardly to place the transverse passages respectively in registration with the restricted passage and the passage in the first-mentioned auxiliary pipe, and a spring-pressed member adapted to close the passage in the first-mentioned auxiliary pipe when the member aforesaid has been moved rearwardly.

10. The combination with an air brake system for trains including a train line pipe or conduit and a brake cylinder, of means for automatically maintaining the pressure of air in the brake cylinder substantially equal to the air pressure in the main pipe, said means including auxiliary pipes connected respectively to said brake cylinder and train line pipe, a tube connected to said auxiliary pipes having a restricted passage in communication with the second-mentioned auxiliary pipe, an auxiliary cylinder connected to the second auxiliary pipe, a piston in said auxiliary cylinder, a rod secured to said piston having transverse passages and a longitudinally extending passage connecting said transverse passages, one transverse passage being adapted to register with a portion of the restricted passage aforesaid, the other transverse passage being adapted to register with the passage in the first-mentioned auxiliary pipe, and a yieldable member for actuating said piston.

In testimony whereof I affix my signature.

DENNIS C. HESSIAN.